(12) United States Patent
Fischer et al.

(10) Patent No.: US 7,976,698 B2
(45) Date of Patent: Jul. 12, 2011

(54) INTEGRATION OF THE REDUCTION OF THE CATALYST OF A CATALYTIC CONVERSION PROCESS AND THE REGENERATION OF ADSORBENT MASSES THAT INTERVENE IN THE PURIFICATION OF THE HYDROGEN THAT IS NECESSARY FOR REDUCTION

(75) Inventors: Béatrice Fischer, Lyons (FR); Frédéric Hoffmann, Sainte Foy les Lyon (FR); Michel Thomas, Rueil Malmaison (FR)

(73) Assignee: IFP Energies nouvelles, Rueil-Malmaison Cedex (FR)

( * ) Notice: Subject to any disclaimer, the term of this patent is extended or adjusted under 35 U.S.C. 154(b) by 865 days.

(21) Appl. No.: 10/350,339

(22) Filed: Jan. 24, 2003

(65) Prior Publication Data
US 2003/0178341 A1 Sep. 25, 2003

(30) Foreign Application Priority Data

Jan. 25, 2002 (FR) ...................................... 02 00954

(51) Int. Cl.
*C10G 35/04* (2006.01)
(52) U.S. Cl. ........... 208/134; 208/137; 208/99; 585/820

(58) Field of Classification Search .................. 208/133, 208/134, 140; 585/820, 822, 830
See application file for complete search history.

(56) References Cited

U.S. PATENT DOCUMENTS

| | | | | |
|---|---|---|---|---|
| 5,912,422 | A * | 6/1999 | Bomard et al. | 95/96 |
| 6,506,703 | B1 * | 1/2003 | Kao et al. | 502/66 |
| 6,514,317 | B2 * | 2/2003 | Hirano et al. | 95/96 |

FOREIGN PATENT DOCUMENTS

| | | |
|---|---|---|
| FR | 1292423 | 5/1962 |
| FR | 2657087 | 7/1991 |
| GB | 1547731 | 6/1979 |

* cited by examiner

*Primary Examiner* — Tam M Nguyen
(74) *Attorney, Agent, or Firm* — Millen, White, Zelano & Branigan, P.C.

(57) ABSTRACT

Process for catalytic conversion in the presence of hydrogen with regeneration of the catalyst that comprises a stage for reduction of said catalyst by the hydrogen that is obtained from the catalytic conversion stage, whereby this hydrogen is purified in advance of impurities that it contains by running it over adsorbent masses, whereby said adsorbent masses are regenerated by an increase in temperature that is provided by the effluent from the reduction stage of the catalyst. Application to the processes for regenerative reforming or dehydrogenation of paraffins and naphthenes and most generally to any moving-bed process that operates in the presence of hydrogen.

7 Claims, 3 Drawing Sheets

INTEGRATION OF THE REDUCTION OF THE CATALYST OF A CATALYTIC CONVERSION PROCESS AND THE REGENERATION OF ADSORBENT MASSES THAT INTERVENE IN THE PURIFICATION OF THE HYDROGEN THAT IS NECESSARY FOR REDUCTION

The invention relates to moving-bed processes for the conversion of hydrocarbons, in which a hydrocarbon feedstock that is treated with a hydrogen-rich gas is transformed. It applies more specifically to the regenerative reforming or to the dehydrogenation of paraffins with continuous regeneration of the catalyst and relates more particularly to the reduction stage of this catalyst.

The catalyst that is used in said conversion processes above generally comprises a substrate that is formed by at least one refractory oxide. The substrate can also include one or more zeolites. The catalyst comprises at least one noble metal that belongs to group VIII of the periodic table, preferably platinum, and preferably at least one promoter metal of group IV B or VII A, for example tin or rhenium, at least one halogen and optionally one or more additional elements such as alkali, alkaline-earth, lanthanide, silicon, or non-noble metal elements of group III A or of group VIII. The catalysts of this type generally contain platinum and at least one other metal deposited on a chlorinated alumina substrate. In a general manner, these catalysts are used for the conversion of naphthenic or paraffinic hydrocarbons that can be transformed by dehydrocyclization and/or dehydrogenation. They are also used in reforming or for the production of aromatic hydrocarbons, for example for the production of benzene, toluene, ortho, meta- or paraxylenes. The hydrocarbons that are used as a feedstock in these different processes are obtained from fractionation of crude oils by distillation or are obtained from other transformation processes such as catalytic cracking or steam-cracking.

The chemical reactions involved in the reforming process are numerous. For reactions that are beneficial to the formation of aromatic compounds and to the improvement of the octane number, it is possible to cite the dehydrogenation of naphthenes, the isomerization of cyclopentane rings, the isomerization of paraffins, the dehydrocyclization of paraffins, and, for the reactions that are adverse to the increase of the octane number, hydrogenolysis and hydrocracking of paraffins and naphthenes. These various reactions have very different speeds and are strongly endothermic for dehydrogenation reactions and exothermic for the other reactions. This is why the reforming process takes place in several reactors that undergo more or less significant temperature drops and requires intermediate reheating furnaces to bring the temperature of the feedstock at the inlet of each furnace to the required level. Experience shows that the majority of the dehydrogenation reactions take place in the first reactor(s).

The processes for reforming or for producing aromatic compounds were carried out at 4 MPa 30 years ago and at 1.5 MPa 20 years ago, and today, it is common practice to see reforming reactors operating at pressures of less than 1 MPa, in particular between 0.3 and 0.8 MPa.

This drop in hydrogen pressure, however, is accompanied by a faster deactivation of the catalyst by coking. The coke, a compound of high molecular weight, essentially based on carbon and hydrogen, is deposited on the active sites of the catalyst. The H/C molar ratio of the coke that is formed varies from about 0.3 to 1.0. The carbon and hydrogen atoms form condensed polyaromatic structures whose degree of crystalline organization varies based on the nature of the catalyst and the conditions of operation of the reactors. Although the selectivity of hydrocarbon transformation into coke is very low, the accumulated coke contents in the catalyst can be significant. Typically, for the fixed-bed units, these contents are between 2.0% and 25.5% by weight. For circulating-bed units, these contents are spread out from 3.0% to 10.0% by weight at the outlet of the last reactor. The coke is deposited for the most part in the last reactor or last two reactors.

The deposition of coke, faster at low pressure, also imposes a faster regeneration of the catalyst. The current regeneration cycles can decrease to 2-3 days.

A large number of patents deal with processes for reforming, for producing aromatic compounds, or for dehydrogenating paraffins with continuous or sequential regeneration of the catalyst.

The diagrams of processes use at least two reactors in which a catalyst moving bed, through which passes a feedstock that consists of hydrocarbons and hydrogen, circulates from top to bottom. The feedstock is reheated between each reactor.

Experience shows that the first reactor is the site of fast reactions that produce a great deal of hydrogen.

Patent FR-2,657,087 describes such a reforming process.

BRIEF DESCRIPTION OF THE DRAWINGS

In FIG. 1 that is reproduced here (identical to FIG. 2 of Patent FR-2,657,087), four reactors are used. An initial feedstock that consists of hydrocarbons and hydrogen is circulated through at least two reaction zones that are arranged in series, side by side, whereby each of these reaction zones is of the moving-bed type. The feedstock successively circulates in each reaction zone, and the catalyst flows from top to bottom continuously in the form of a moving bed. The catalyst that is drawn off at the bottom of each reaction zone is transported in a hydrogen stream to the top of the next reaction zone. The catalyst that is drawn off continuously from the bottom of the last reaction zone is then sent into a regeneration zone.

Figure 1:
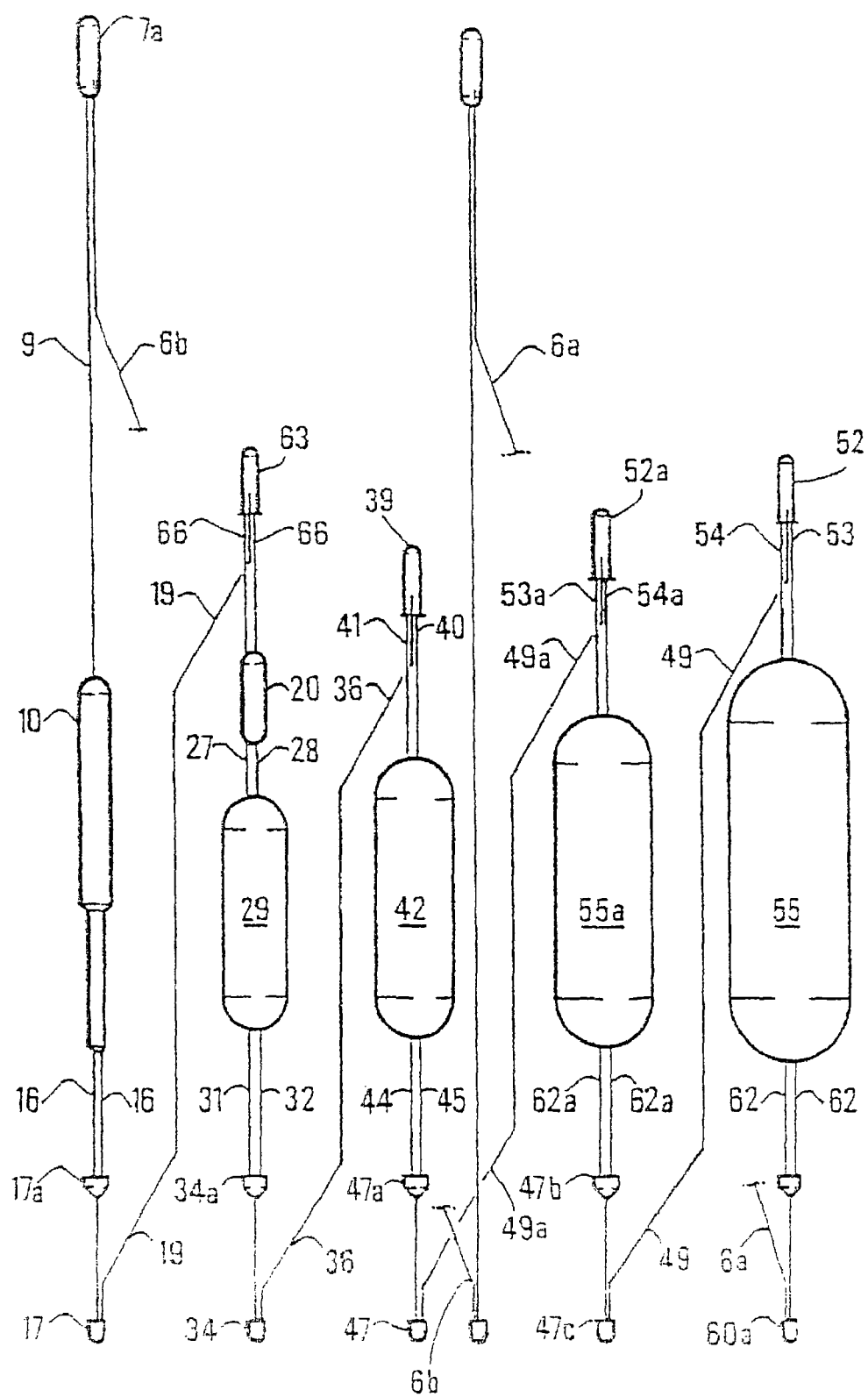
FIG. 1 is a schematic flowsheet of a prior art reforming process.

In referring to FIG. 1, the feedstock that consists of hydrocarbons and hydrogen according to a well-defined H2/HC ratio passes through reactor 1 (29), is reheated in a furnace, not shown, passes through reactor 2 (42), is reheated in a furnace, not shown, passes through reactor 3 (55a), is reheated in a furnace, not shown, passes through reactor 4 (55), and is sent to a separation section that is not shown in FIG. 1.

The catalyst descends into reactor (29) by the feedstock passing through it, is drawn off from reactor (29) via pipes (31) and (32), is collected again in a hopper (34a), is raised toward upper buffer tank (39) of reactor 42 via a lifting means (34) and (36). The catalyst then flows from this buffer tank (39) via pipes (40) and (41) to reactor (42), is drawn off from (42) via pipes (44) and (45), is collected again in a hopper (47a), is raised toward upper buffer tank (52a) of reactor 55a via a lifting means (47) and (49a). The catalyst then flows from this buffer tank (52a) via pipes (53a) and (54a) to reactor (55a). It is drawn off from (55a) via pipes (62a), is collected again in a hopper (47b), is raised toward upper buffer tank (52) of reactor (55) via a lifting means (47c) and (49). The catalyst then flows from this buffer tank (52) via pipes (53)

and (54) toward reactor (55), is drawn off from (55) via pipes (62), is collected again in a hopper, is raised toward upper buffer tank (7a) of regenerator (10) via a lifting means (60a), (6a) and (6b). The catalyst then flows from this buffer tank (7a) via a pipe (9) toward regenerator (10), is drawn off from (10) via pipes (16), is collected again in a hopper (l7a), is raised toward upper buffer tank (63) of reactor 1 via a lifting means (17) and (19). The catalyst then flows from this buffer tank (63) via pipes (66) to a reduction tank (20), in which it at least partially regains its metallic shape. Finally, the catalyst flows via pipes (27) and (28) toward reactor (29).

The treatment of the feedstock in the reactors for reforming or producing aromatic compounds generally takes place under pressures of between 0.3 and 0.8 MPa at temperatures of between 480 and 600° C. and volumetric flow rates of between 1 and 4 $h^{-1}$ and with hydrogen/hydrocarbon ratios (in moles/moles) that are preferably between 3 and 10 and more particularly between 3 and 4 for regenerative reforming and between 4 and 6 for the process for the production of aromatic compounds.

For dehydrogenation of paraffins, the operating conditions are generally a pressure of between 0.1 and 1 MPa, a temperature of between 400 and 700° C. and preferably between 550 and 650° C., and a volumetric flow rate of between 0.2 and 4 $h^{-1}$ and with H2/HC (hydrogen/hydrocarbon) molar ratios that are preferably at most 6.

The regeneration of the catalyst generally is carried out primarily in three stages:
 (a) a combustion stage in which the coke is eliminated by burning with a gas that contains oxygen,
 (b) a halogenation stage in which the catalyst is flushed by a halogenated gas that makes it possible to reintroduce halogen in the catalyst and to redisperse the metal phase,
 (c) a drying or calcination stage that eliminates from the catalyst the water that is produced by the combustion of the coke produced in stage (a).

The regeneration of the catalyst is completed by a reduction stage in which the catalyst is reduced prior to the introduction of the feedstock. This reduction stage is generally carried out between the regenerator, where stages (a), (b) and (c) are used, and the first reactor in which the reforming or dehydrogenation reaction takes place.

The reduction consists of a chemical transformation of the metal phase that is contained in the catalyst. At the end of the preparation of the catalyst or the calcination stage that the catalyst undergoes in regeneration (stage c), the metal element or elements are present on the surface of the catalyst in oxide form or in virtually catalytically inactive oxychloride form. Before the hydrocarbon feedstock to be treated is injected, it is therefore necessary to initiate the reduction of the catalyst that will transform the catalyst into a catalytically active state. In practice, this reduction is carried out at a high temperature between 400 and 600° C. and preferably between 450 and 550° C. in the presence of hydrogen and during residence times that are generally between several minutes and several hours. More specifically, the dwell time of the catalyst during the reduction stage is between 15 minutes and 2 hours and preferably between 30 minutes and 1.5 hours. The specific flow rates of reducing gas are conventionally between 0.1 to 10 $Nm^3$/h/kg of catalyst and preferably between 0.5 and 5 $Nm^3$/h/kg of catalyst.

This reduction operation can be carried out by using either hydrogen gas that is obtained from the liquid-gas separator located downstream of the last reactor, or from a gas that is richer in hydrogen obtained from a more intensive separation, located further downstream from the unit. In both cases, the gas that is used offers a drawback that is linked to the presence of significant amounts of light hydrocarbons. This gas can actually contain more than 15% by volume of hydrocarbons C2+(i.e., hydrocarbons that contain at least two carbon atoms per molecule), C2H4 with aromatic hydrocarbons with about 10 carbon atoms. The hydrocarbons, and in particular the C3 and C4 (hydrocarbons that contain 3 or 4 carbon atoms per molecule) that are present as impurities, undergo exothermic cracking reactions that in some cases, for example when the hydrogen gas flow rate is low, can lead to temperature instabilities in the reduction zone that require the user to limit the initial temperature of the hydrogen gas. Thus, to limit a possible risk of temperature increase in a reduction zone, a purification of the hydrogen used for said reduction will generally have to be included. In this case, the hydrogen undergoes a separation process that makes it possible to obtain a so-called purified hydrogen that contains less than 5 mol % and preferably between 0.5 mol % and 1 mol % of hydrocarbons and more preferably less than 0.5 mol % of light hydrocarbons such as ethane and propane.

The purification process that is commonly used is a process that operates by membranes. The membranes that are used are based on composites of fibers. Another process that is called PSA ("Pressure Swing Adsorption") can be used in gas purification. This process operates on the basis of an adsorption/desorption cycle. The adsorption is carried out on high-pressure adsorbent masses, and the desorption is carried out by shifting the impurities from the adsorbent masses by the effect of pressure reduction. The PSA process is suitable particularly for light fluids (that contain less than four carbon atoms), because for the heavier fluids, the pressure reduction that is necessary for the desorption becomes too high. For the applications of concern in which the fluids contain a portion of compounds with more than four carbon atoms, the PSA process is therefore less well adapted than membrane purification. Furthermore, the membrane systems are based on the difference in the velocity of compounds of passing through a membrane, whereby the heaviest compounds generally have a lower pass-through velocity than the lighter compounds and also require high pressures, generally on the order of several tens of bars. The membranes that are most used within the context of the invention are based on composite polymer fibers.

Figure 2:
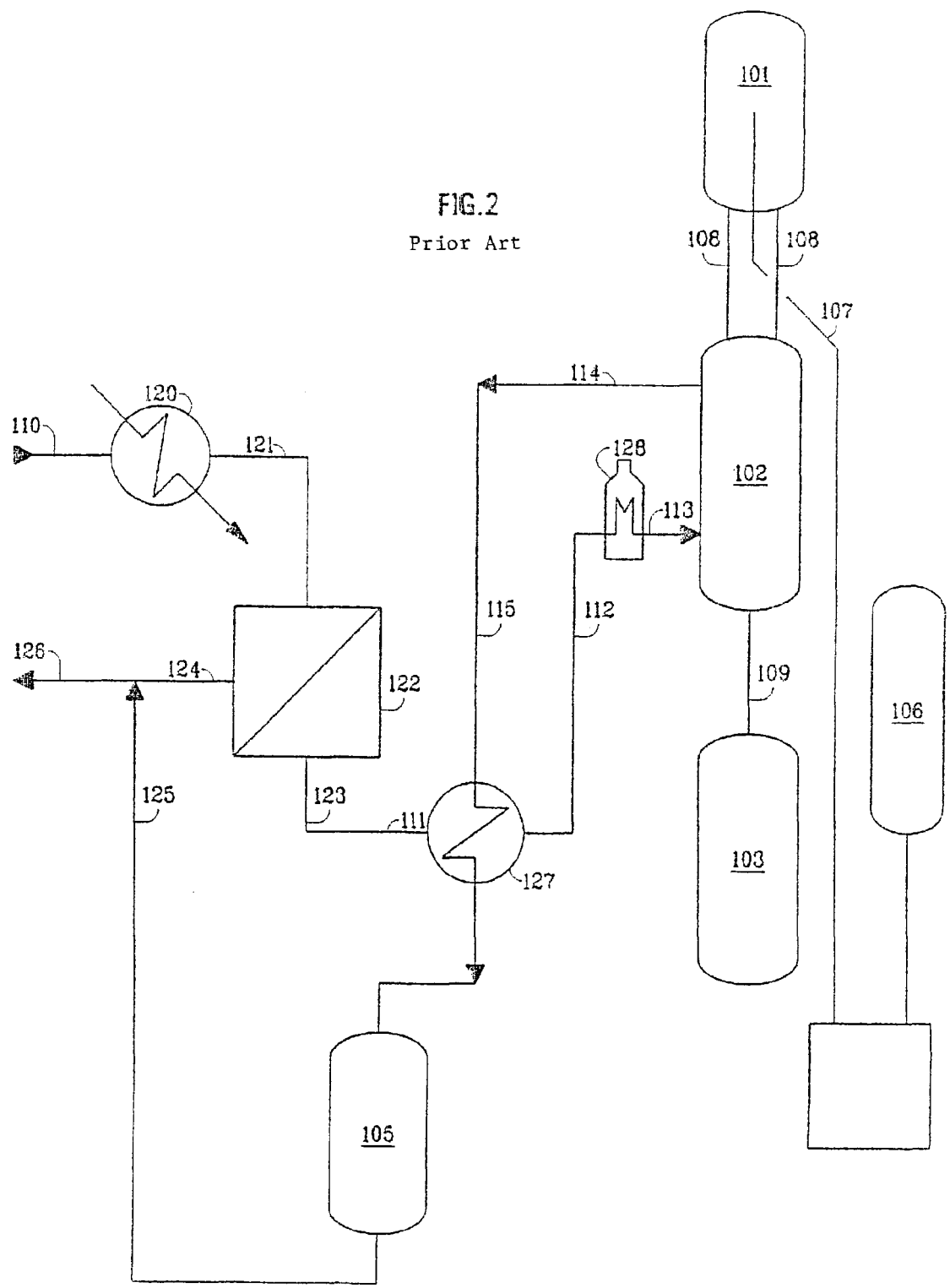
FIG. 2 is a schematic flowsheet of a prior art reforming process wherein membrane separation is employed to remove impurities from the hydrogen.

FIG. 2 describes an embodiment according to the prior art, in which purification unit (122) is a membrane unit. The catalyst circulates from regenerator (106) to upper buffer tank (101) via a transfer means (107) that is, for example, an elevator or lift. It descends under the action of gravity via pipes (108) to reduction zone (102). This reduction zone can be axial or radial. It can be combined with first reactor (103) by being placed at the top of this first reactor or separate from this reactor as shown in FIG. 2. The catalyst that exits from the reduction zone passes through pipe(s) (109) into first reactor (103). The gas that contains the hydrogen that is used for the reduction stage is brought in via pipe (110). It is preheated via an exchange means (120) (for example a conventional exchanger) to the optimal temperature that is required for the membrane. The heated gas is sent through a pipe (121) to membrane unit (122). Two flows exit from the membrane unit: hydrogen-rich permeate (123) that is used as reduction fluid and residue (124) that is high in hydrocarbon and low in hydrogen. Permeate (123) flows through pipe (111) to a feedstock/effluent exchanger (127), in which the purified hydrogen is preheated. The gas is then brought to the temperature of the reduction stage by at least one heating means (128) (for example a furnace). Resulting flow (113) is used to reduce the catalyst in chamber (102). Effluent (114) at the reduction outlet (102) is cooled in feedstock/effluent exchanger (127)

and, if necessary, undesirable impurities (chlorine, water, etc. . . ) are removed therefrom with capture masses in at least one piece of capture equipment (105). Gas (125) itself is sent to the reaction section of the process via pipe (126). Residue (124) of the membrane system is sent directly to the reaction section of the process via pipe (126) after optional mixing with flow (125).

The membrane optimally operates at a temperature of 80° C. The effectiveness of the membrane will be greater the higher the pressure differential between the inlet of the membrane and the outlet of the permeate. For the application to the purification of the gas used in the reduction of the reforming catalyst, the pressure at the inlet of the membrane is typically 2.2 MPa, and the pressure of the permeate is 0.8 MPa. The effectiveness of the corresponding membrane makes it possible to reduce the content of hydrocarbons that are heavier than ethane from 6.55 mol % to 0.5 mol %.

SUMMARY OF THE INVENTION

The process according to this invention comprises an original method for purification of the hydrogen that is necessary to the stage for reduction of the catalyst that is used in one of the moving-bed processes described above. The purification of the hydrogen is carried out in an adsorption process by a TSA process (Temperature Swing Adsorption), i.e., a process for adsorption in adsorbent masses in which the regeneration stage of these adsorbent masses is carried out by an increase in temperature. In practice, this temperature effect is obtained by flushing the adsorbent masses by a hot gaseous stream, and this gas within the scope of the invention consists of at least a portion of the effluent that is obtained from the reduction stage of the catalyst. In an industrial implementation, at least two adsorption reactors that work alternately are used, one in adsorption and the other in regeneration, in other words a "swing" adsorption system.

MORE DETAILED DESCRIPTION OF THE INVENTION

More specifically, the invention relates to a process for treatment of a hydrocarbon-containing fraction with a catalyst that circulates in a moving bed in which said catalyst is subjected to stages for treatment of the hydrocarbon fraction, for regeneration then reduction before being reintroduced into the treatment stage. Each of these stages is preferably carried out in at least one specific zone, whereby the treatment stage and the reduction stage operate in the presence of hydrogen, and the treatment stage uses at least one dehydrogenation reaction. The reduction stage of the catalyst is carried out with a hydrogen-rich gas that should be freed of possible hydrocarbon-containing compounds that it contains so as to avoid any risk of temperature increase during this reduction stage. The invention relates in particular to the purification of this hydrogen-rich gas of the hydrocarbon-containing compounds that it contains and calls for an adsorption in adsorbent masses preferably such absorbent masses that are described below. The invention also relates to the regeneration of said adsorbent masses by a temperature-increasing effect. This temperature-increasing effect is obtained by using a hot gas that preferably comprises at least a portion of the effluent of the reduction stage of the catalyst.

In the process according to the invention, the effluent of the reduction stage of the catalyst is preferably purified of the chlorine that it contains in a specific purification unit before the catalyst is treated in a regeneration phase of the purification unit by adsorption.

The adsorbents that can be used in this process are preferably selected from among the molecular sieves or zeolites, activated carbons or mesoporous adsorbents of activated alumina type or silica gel type.

With regard to the zeolites, also referred to as molecular sieves, they are preferably selected from zeolites of type A (family of LTA), type X or Y (family of FAU faujasites) or else of type MFI (ZSM-5 and silicalite).

Among the zeolites of type A (family of LTA), it is possible to select a 4A or NaA zeolite, but preferably a 5A or CaA zeolite, whose Na/Ca exchange rate varies between 0 and 85 mol %, will be taken. Among the zeolites of type X (family of faujasites), preferably a zeolite of type 13X or NaX will be selected, but it is possible to use other exchange cations, by themselves or in combination, such as, for example, Ca, Ba, Li, Sr, Mg, Rb, Cs, Cu, Ag . . . Among the zeolites of type Y, the form NaY is preferably selected, but the same exchange cations as above can be used, and the Si/Al molar ratios of the zeolite are preferably between 2.5 and infinity, whereby this latter case corresponds to a dealuminified zeolite Y. Among the zeolites of type MFI, preferably the ZSM-5 whose Si/Al ratio varies from 1 to infinity is selected, whereby this latter case corresponds to silicalite.

The selection of the zeolite is guided by the composition of the feedstock that is to be treated, whereby the presence of large molecules (aromatic compounds or isoparaffins, for example) to be adsorbed requires an adequately open zeolite, preferably of type X or Y (faujasite).

Other adsorbents that can be used for this application include but are not limited to, activated carbons and preferably those that have a specific BET surface area, conventionally determined by physisorption of nitrogen at 77° K., between 300 and 3000 m2/g, activated aluminas or silica gels, and preferably those that have a specific BET surface area that is between 150 and 800 m2/g.

All of these adsorbents are preferably used in a fixed bed in the form of balls or extrudates. They can be used either by themselves or in a mixture. In this latter case, a multilayer adsorbent bed will be formed.

DESCRIPTION OF AN EMBODIMENT ACCORDING TO THE INVENTION

Figure 3:
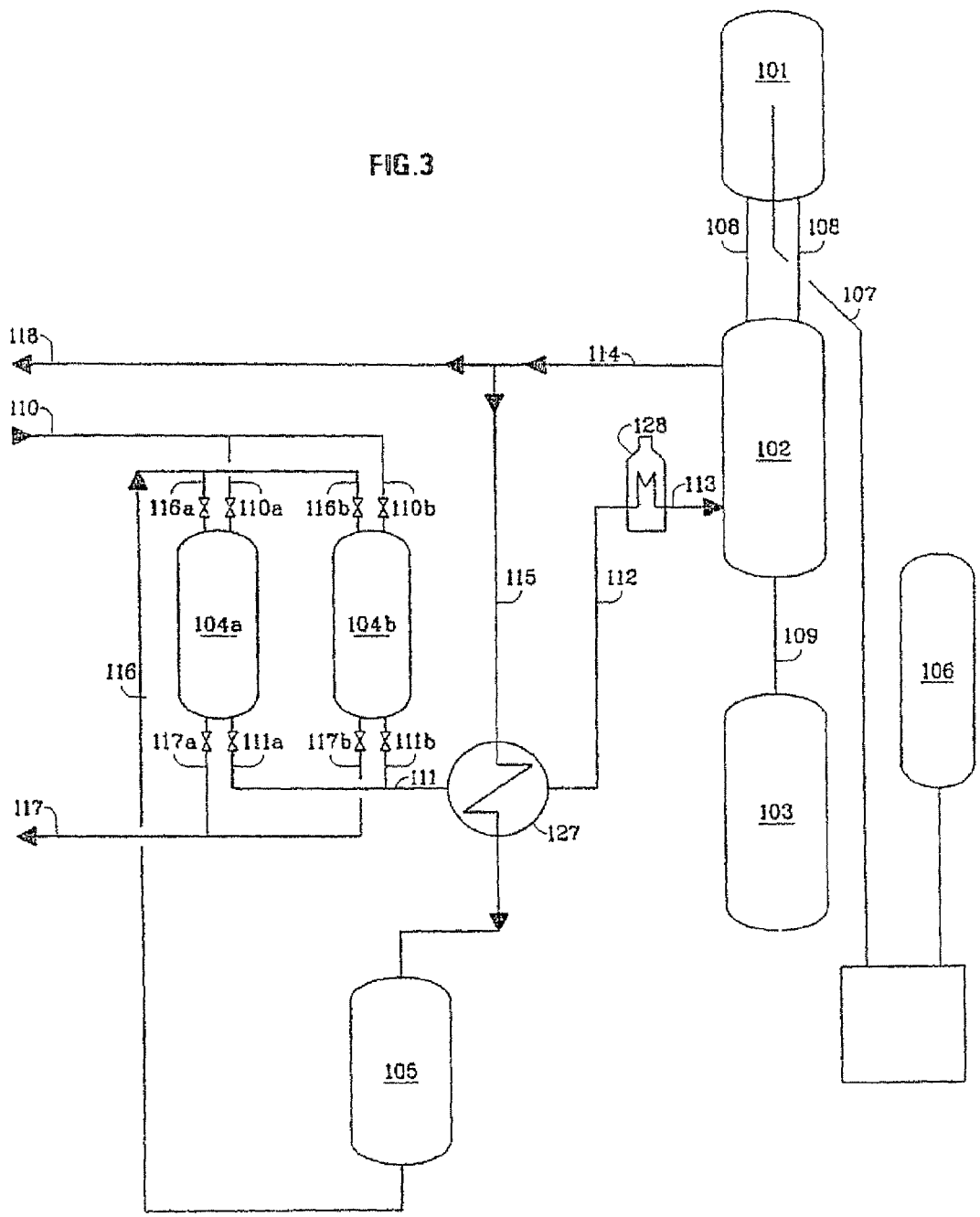
FIG. 3 is a flowsheet of a comprehensive embodiment of the invention.

The invention is illustrated in FIG. 3 that represents one of the possible embodiments that is not at all limiting of this invention. The catalyst circulates from regenerator (106) to upper buffer tank (101) via a transfer means (107) that is, for example, an elevator or lift. It descends under the action of gravity via pipes (108) to reduction zone (102). This reduction zone can be axial or radial. It can be combined with first reactor (103) by being placed at the top of this first reactor or separate from this reactor (case of FIG. 3). The catalyst that exits from the reduction zone passes via pipe(s) (109) into first reactor (103). The gas that contains the hydrogen that is used for the reduction stage is brought via pipe (110). This gas is obtained in the great majority of cases at least in part from the reaction section of the process, i.e., the catalytic conversion stage. It could also be obtained at least in part from a source outside of the process. Advantageously, it is brought, via pipes (110a) or (110b), to at least one adsorber (104a or b) in which the heaviest molecules are captured by adsorbent masses. At the outlet of the adsorber, the purified gas flows through pipes (111a) or (111b), then (111) to a feedstock/effluent exchanger (127) in which the purified hydrogen is preheated. The gas is then brought to the temperature of the reduction stage, by at least one heating means, for example a furnace (128). Resulting flow (113) reduces the catalyst in chamber (102). Effluent (114) at reduction outlet (102) is divided into two flows: one flow (118) that returns directly to the reaction section of the unit and a flow (115) that is called hot gas below that will be used to regenerate adsorbent masses. Flow (115) is cooled in feedstock/effluent exchanger (127) to the optimal temperature for regeneration of adsorbent masses. The hot gas can then, if necessary, be freed of the undesirable impurities that it contains following the regeneration stage (chlorine, water, etc . . . ) with capture masses in at least one piece of capture equipment (105). The gas itself is then directed via pipes (116a or 116b) to at least one of adsorption sections (104a or 104b) that each comprise at least one adsorber, optionally several adsorbers, and in which is carried out a transfer of molecules that are adsorbed from masses to the hot gas. The regeneration gas returns to the reaction section of the process via pipes (117a or 117b) and common pipe (117). The adsorbent masses are regenerated and ready for a new adsorption/desorption cycle. The adsorbers are in some cases in adsorption phase and in other cases in desorption phase. The number of adsorbers in adsorption phase and in regeneration phase can be variable and when several absorbers are involved in a phase of the process, the adsorbers can be either in a series or in parallel. FIG. 3 represents a flowsheet with an adsorber in adsorption phase and an adsorber in regeneration phase, a configuration that is called swing or alternating. The passage from the adsorption phase to regeneration phase s' is carried out by a system of valves installed on pipes (110a, 110b, 111a, 111b, 116a, 116b, 117a, 117b). The sequenced opening and closing of these different valves makes it possible, for example, to connect adsorber (104a) to the gas to be purified and to purified gas by pipes (110a and 111a) and by the same token adsorber (104b) to regeneration gas and to the regeneration effluent via pipes (116b and 117b). In the next cycle, adsorber (104a) will be connected to the regeneration gas and to the regeneration effluent via pipes (116a and 117a), and adsorber (104b) will be connected to the gas to be purified and to the gas that is purified by pipes (110b and 111b).

The invention operates under the following preferred conditions:

1) The adsorption will be carried out at a temperature T1 that is between 0° C. and 300° C., preferably between 20° C. and 120° C., and a pressure P1 of between 0.1 MPa and 5 MPa, preferably between 0.5 MPa and 2.5 MPa.
2) The desorption (regeneration of adsorbent masses) is carried out at a temperature T2 that is higher than T1, preferably between 100° C. and 350° C., more preferably between 220° C. and 280° C., and a pressure P2 of preferably between 0.1 MPa and 5 MPa, more preferably between 0.5 MPa and 2.5 MPa.
3) The targeted specification at the adsorption outlet is a content of C2+compounds in the hydrogen-rich gas that is preferably less than 5 mol % and preferably between 0.5 mol % and 1 mol %.

The invention also relates to the purification of the hydrogen-rich gas that is necessary to the reduction stage of the catalyst by an adsorption/desorption process with regeneration by a TSA system by using the effluent from the reduction zone of the regeneration section of the catalyst as a hot gas for the desorption phase. This process has one or more significant advantages:

(a) The purification of the hydrogen operates at virtually constant pressure. It does not require high pressure energy. The required pressure differential is on the order of 0.03 MPa compared to 1.5 MPa for membrane or PSA-type purification processes at equivalent performance levels.
(b) The purification of the hydrogen does not require preheating, as is the case for the membranes since the membranes preferably operate around 80° C. More specifically, the adsorption phase preferably takes place between 20° C. and 60° C. and, in the large majority of cases, it can take place at temperatures of between 20° C. and 40° C.
(c) The energy that is required for the regeneration of the adsorbent is available thanks to the outlet effluent temperature of the reduction stage of the catalyst.

Typically, the temperature that is necessary for regeneration is between 100° C. and 350° C., preferably 220° C. to 280° C., and the effluent that is obtained from the reduction stage of the catalyst after preheating (127) is available at a temperature of about 250° C. The thermal energy that is contained in the effluent of the reduction stage of the catalyst is therefore very effectively used in the process.

These technical advantages lead to a gain in the energy balance of the process primarily on the level of the pressure differential that is required relative to the membrane or PSA-type processes and an investment gain, essentially due to the elimination of exchanger (120) of FIG. 2.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

Embodiment According to the Invention and Comparison with the Prior Art

Compared below are a standard flowsheet comprising a membrane purification unit as represented in FIG. 2 and a diagram according to the invention in which the purification unit is of the TSA type as shown in FIG. 3.

The case of application is that of the purification of the hydrogen for reduction of the regenerative reforming catalyst.

The regenerative reforming unit is of the type of the one shown by FIG. 1. It treats 10 tons per hour of a hydrotreated naphtha (fraction that is obtained from the distillation of crude, containing hydrocarbons that have at least 5 carbon atoms and that have a final boiling point of 220° C.), e.g., a distillation gasoline or cracking gasoline that make it possible to obtain a gasoline with a research octane number or RON (English terminology abbreviation Research Octane Number) of 100. The unit uses the catalyst of CR 401 that is marketed by the PROCATALYSE Company.

The flow rate of hydrogen-rich gas that is to be treated to carry out the reduction of the catalyst is 454 kg/h.

The composition of the hydrogen-rich gas at the inlet and outlet of the purification unit is given in the table below:

The terms C1, C2 . . . C7 designate mixtures of hydrocarbon-containing compounds with 1, 2 . . . 7 carbon atoms per molecule that are present in a small amount in the gas that is to be treated.

| Component | Initial Composition (mol %) | Composition Required at Outlet (mol %) |
|---|---|---|
| H2/Hydrogen | 89.69 | 95.5 |
| C1 | 3.76 | 4.0 |
| C2 | 3.52 | 0.5 |
| C3 | 1.90 | 0.0 |
| C4 | 0.78 | 0.0 |
| C5 | 0.15 | 0.0 |
| C6 | 0.18 | 0.0 |
| C7 | 0.02 | 0.0 |

The operating conditions for the case that employs membranes (according to the state of the art) and the case that employs a TSA process (according to the invention) are provided in the table below:

| | Membrane | Adsorption/Desorption (TSA) |
|---|---|---|
| Initial Temperature | 80° C. | 25° C. |
| Initial Pressure | 2.20 MPa | 0.73 MPa |
| Outlet Pressure | 0.70 MPa | 0.70 MPa |

According to FIG. 3, the TSA purification unit employs two reactors (104a) and (104b) that work alternately (swing). Below, the cycle of reactor (104a) is described, knowing that this cycle is exactly the same for reactor (104b), whereby one is in adsorption when the other is in regeneration and vice versa.

The adsorption is carried out by bringing the gas to be treated that is brought via line (110) into communication with reactor (104a) by opening valves (110a) and (111a) and closing valves (116a) and (117a). The adsorption is carried out at 25° C. under a pressure of 0.73 MPa.

The regeneration of the adsorbent masses takes place every hour at 250° C. and a pressure of 0.7 MPa. It is carried out by the connection of reactor (104a) to the circuit of the effluent of the reduction (line 115) after cooling in exchanger (127) and purification in unit (105). This connection is produced using valves (116a) and (117a) that are then open while valves (110a) and (111a) are closed.

The purity of the hydrogen-rich gas after the adsorption phase is 95.5% with a content of compounds that have more than two carbon atoms that is less than 0.5 mol %.

The gains of the process by adsorption/desorption relative to the membrane technology are:
  Energy gain: 454 kg/h of compressed gas of 0.73 to 2.2 MPa, or 105 kW, which corresponds to 23% of the total energy dissipated in the process.
  Investment gain: Elimination of exchanger (120) that corresponds to 21% of the investment cost.

The preceding examples can be repeated with similar success by substituting the generically or specifically described reactants and/or operating conditions of this invention for those used in the preceding examples.

The entire disclosure[s] of all applications, patents and publications, cited herein and of corresponding French application No. 02/00,954, filed Jan. 25, 2002 is incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for catalytic regenerative reforming of a distillation gasoline or cracking gasoline in the presence of hydrogen and comprising regeneration of the catalyst, said regeneration comprising reducing said catalyst with at least part of the hydrogen used in reforming of said gasoline thereby producing a reduced catalyst and a gaseous effluent, wherein prior to the reduction of the catalyst with said hydrogen-containing gas, the latter gas is purified by removing C2+ hydrocarbons in a purification unit by adsorption that employs adsorbent masses, such that the content of the C2+ compounds in gas exiting the purification unit is between 0.5 mol % and 1 mol %, said adsorbent masses being regenerated, in a temperature swing adsorption unit, at a temperature of 220° to 280° C. and a pressure of 0.5 to 2.5 MPa, by an increase in temperature obtained from at least a portion of the gaseous effluent produced from reducing the catalyst with hydrogen-containing gas.

2. A process according to claim 1, wherein the hydrocarbon-containing feedstock is a distillation gasoline or cracking gasoline, and the catalytic reactions are reforming reactions.

3. A process according to claim 1, wherein the adsorbent masses of the process for purification by adsorption are selected from the group that consists of: zeolites of type X, Y or MFI, activated carbons and mesoporous adsorbents of activated alumina or silica gel.

4. A process according to claim 1, wherein the gaseous effluent from reduction of the catalyst contains chlorine, and said effluent treated to remove the chlorine contains in a specific purification unit upstream of the step of regenerating by a regeneration by adsorption.

5. A process according to claim 1, wherein the adsorption is conducted at 20° C. to 60° C.

6. A process according to claim 1, wherein regeneration of the catalyst is carried out continuously.

7. A process for catalytic regenerative reforming of a distillation gasoline or a cracking gasoline operating in the presence of hydrogen, said process comprising a section for regeneration of catalyst used in said reforming, said regeneration comprising reduction of said catalyst by at least a part of the hydrogen used in the reforming process, this hydrogen being previously purified of C2+ content at a level ranging between 0.5 mol % and 1 mol % by adsorption in a TSA unit employing adsorbent masses that are regenerated by an increase in temperature, heat needed for this regeneration being provided by the gaseous effluent of the regeneration step of the catalyst, the adsorbent masses used in the TSA unit being X, Y or MFI zeolites, activated carbons or mesoporous adsorbents of activated alumina or silica gels.

* * * * *